(12) United States Patent
Sestili

(10) Patent No.: US 8,612,758 B2
(45) Date of Patent: Dec. 17, 2013

(54) SYSTEM AND METHOD FOR INHERENTLY SECURE IDENTIFICATION OVER INSECURE DATA COMMUNICATIONS NETWORKS

(75) Inventor: Sergio Sestili, Leghorn (IT)

(73) Assignee: Sergio Sestili, Leghorn (IT)

( * ) Notice: Subject to any disclaimer, the term of this patent is extended or adjusted under 35 U.S.C. 154(b) by 778 days.

(21) Appl. No.: 11/663,596

(22) PCT Filed: Oct. 6, 2005

(86) PCT No.: PCT/EP2005/010776
§ 371 (c)(1),
(2), (4) Date: Mar. 23, 2007

(87) PCT Pub. No.: WO2006/037641
PCT Pub. Date: Apr. 13, 2006

(65) Prior Publication Data
US 2007/0266245 A1    Nov. 15, 2007

(30) Foreign Application Priority Data
Oct. 8, 2004  (IT) .............................. MI2004A1913

(51) Int. Cl.
*H04L 29/06* (2006.01)
(52) U.S. Cl.
USPC ......................................... 713/168; 713/184
(58) Field of Classification Search
USPC ................................................ 713/168, 184
See application file for complete search history.

(56) References Cited

U.S. PATENT DOCUMENTS

| | | | | |
|---|---|---|---|---|
| 4,630,201 A * | 12/1986 | White | ............................. | 705/44 |
| 5,478,994 A | 12/1995 | Rahman et al. | | |
| 5,627,355 A * | 5/1997 | Rahman et al. | ............... | 235/380 |
| 5,872,917 A * | 2/1999 | Hellman | ........................... | 726/6 |
| 5,995,624 A * | 11/1999 | Fielder et al. | ................. | 713/169 |
| 6,775,770 B1 * | 8/2004 | Davis et al. | ................... | 713/156 |
| 7,149,895 B1 * | 12/2006 | Asokan et al. | ................ | 713/159 |

(Continued)

OTHER PUBLICATIONS

Menezes A et al: "Hanbook of Applied Cryptography, Identification and Entity Authentication" Handbook of Applied Cryptography, CRC Press Series on Discrete Mathematices and Its Applications, Boca Raton, FL, CRC Press, US, 1997, pp. 385-424, XP002262234 ISBN:0-8493-8523-7 p. 395, paragraph 10.2.5—p. 397, paragraph 10.8 p. 387, paragraph 10.1.2.1.

(Continued)

*Primary Examiner* — Taghi Arani
*Assistant Examiner* — Tracy Mangialaschi
(74) *Attorney, Agent, or Firm* — Modiano & Associati; Albert Josif; Daniel O'Byrne

(57) ABSTRACT

A method for secure identification of stations connected over data communications networks during a transaction, comprising transmitting, on the part of a first station to a second station, an identification index of a reference cell in a sequence of codes known to both stations and a first code in the sequence and chosen according to a first criterion known to both stations; identifying, by the second station, a cell in the sequence through the received index; verifying the first code by the second station; transmitting, by the second station toward the first station, a second code, in the series of codes calculated according to a second criterion known to both stations; verifying by the first station, the correctness of the second code; marking, by the first station and preferably also by the second station, the indices related to the codes that have been used as unusable for subsequent transactions.

19 Claims, 4 Drawing Sheets

(56) References Cited

U.S. PATENT DOCUMENTS

| | | | |
|---|---|---|---|
| 7,606,771 B2* | 10/2009 | Keresman et al. | 705/67 |
| 2002/0072349 A1* | 6/2002 | Geiselman et al. | 455/411 |
| 2005/0167491 A1* | 8/2005 | Sia | 235/382 |
| 2006/0168657 A1* | 7/2006 | Baentsch et al. | 726/21 |

OTHER PUBLICATIONS

Kuhn M: "OTPW—A one-time password login package" Online! Sep. 30, 2003, XP002366552 Retrieved from the Internet: URL:http://www.cl.cam.ac.uk/{mgk25/otpw.html} retrieved on Feb. 7, 2006! p. 1—p. 4, paragraph Installation.

* cited by examiner

SYSTEM AND METHOD FOR INHERENTLY SECURE IDENTIFICATION OVER INSECURE DATA COMMUNICATIONS NETWORKS

The present invention relates to the field of security in the exchange of data performed over data communications networks, with particular reference to public-access and insecure data communications networks.

BACKGROUND OF THE INVENTION

The rapid technological development experienced in recent years, the diffusion of low-cost data communications tools, the worldwide spread of data communications networks in general and of the Internet in particular have revolutionized traditional behaviors that were widely used before the onset of the information age.

Data communications networks are now used universally not only in the scientific field but also in everyday life by ordinary users to exchange data and carry out transactions of all kinds. The term "transaction" is used, in this text, to reference one or more operations for the exchange of data between two or more users or stations connected to a data communications network, performed in order to carry out an activity as a whole. A transaction, therefore, identifies a series of operations required so that a customer purchases a product or service from a supplier, to request data related to a file and receive the file from a server, to perform a query in a home-banking service, and so forth.

One of the most important characteristics of data communications network is the possibility to accept connections by a virtually infinite number of stations. The term "station" does not necessarily reference a physical station but rather a logical station, i.e., any entity that is capable of connecting to the data communications network, even from different locations, and is provided by means of an adequate IT tool, for example a personal computer, a handheld computer, a cellular telephone or any device provided with suitable interface ports and with the corresponding communications software, so long as it can be identified uniquely by the other side of the connection. In particular, the term "station" can indicate generically the user himself, who can work on the network from different physical stations, for example from different terminals, but always be identified by means of his own identification data, or can indicate equally the instrument used by the user, for example his credit card or smart card, which can be used in any reader independently of the physical or geographical station.

On the one hand, these characteristics of portability and possibility of high connectivity are one of the strongest points of data communications networks; on the other hand, this universal accessibility to the network causes enormous problems as regards security in the transmission of data and in transactions. It is in fact possible to produce software programs that are capable of monitoring and capturing data in transit over the data communications network, and this circumstance, in the case of ill-intentioned persons, can lead to the possibility to use fraudulently the eavesdropped information, taking the place of the legitimate party in a transaction.

A typical and unfortunately well-known case is the eavesdropping of credit card identification data and the unauthorized use of the data thus obtained, in which the ill-intentioned person, by impersonating the owner of the credit card, can take substantial sums from the owner. However, this is only an example of the need to identify correctly the parties of a transaction who exchange data between two stations over a data communications network, a need which occurs in countless contexts of everyday life.

Therefore, it is not surprising that substantial efforts and resources have always been dedicated to improving the security of data communications transactions. The approaches that have been used are aimed substantially at making it difficult to understand the data in transit on the network, for example by means of increasingly advanced and complex techniques and algorithms for encoding and encrypting the data. Unfortunately, these techniques, despite being efficient, have not proved to be 100% secure, since it is possible for an ill-intentioned person to eavesdrop the encrypted data and try to decipher their content by using adequate hardware/software tools.

SUMMARY OF THE INVENTION

The aim of the present invention is to overcome the drawbacks noted above by introducing a new transaction system that prevents fraudulent use of information even if an ill-intentioned individual has eavesdropped and acquired data in transit over the network.

Within this aim, an object of the present invention is to introduce an identification system that ensures the correctness of a transaction by guaranteeing the identity of the stations that are exchanging data throughout the duration of the transaction itself.

Another object of the present invention is to introduce an inherently secure identification system that does not even require encryption of the exchanged information.

Another object of the present invention is to introduce a secure identification system that can be easily implemented and associated with traditional data exchange and transaction methods currently in use, so as to be as transparent as possible in the context of the habitual use of the data communications network on which it is provided.

This aim and these and other objects, which will become better apparent from the description that follows, are achieved by a system for secure identification of stations connected via data communications networks during a transaction, which comprises: means for the selection and transmission, on the part of a first station to a second station, of an identification index of a reference cell that belongs to a sequence of codes that is known both to the first station and to the second station and a first code that belongs to the sequence and is chosen according to a first criterion, which is known to both stations; means for the identification, on the part of the second station and by means of the received index, of said reference cell in the sequence of codes; means for verification of the first code on the part of the second station; means for selection and transmission, on the part of the second station and toward the first station, of a second code, which belongs to the series of codes and is calculated according to a second criterion, which is known both to said first station and to said second station; means for verification, on the part of the first station, of the correctness of the second code; means for marking, on the part of the first station and preferably also of the second station, of the indices related to the codes that have been used as unusable for subsequent transactions.

The intended aim and objects are also achieved by a method for secure identification of stations connected via data communications networks during a transaction, which comprises the steps of: transmitting, on the part of a first station to a second station, an index which identifies a reference cell that belongs to a sequence of codes that is known both to the first station and to the second station, and of a first code that belongs to the sequence of codes and is selected according to a first criterion, which is known both to the first station and to the second station; identifying, by means of the received index, on the part of the second station, said reference cell in the sequence of codes; verifying the first code by the second station; transmitting, on the part of the second station to the first station, a second code that belongs to the series of codes and is calculated on the basis of a second criterion, which is known both to the first station and to the second station; verifying the second code by the first station; marking, on the part of the first and second stations, the indices related to the codes that have been used as unusable for subsequent transactions.

Advantageously, in the continuation of the transaction, the first and second stations use additional codes which belong to said code sequence to identify each other in each step of communication, said codes being calculated according to a criterion known to both stations.

As an alternative, at each step of the communication the first station can send a new index together with a respective code.

Conveniently, the criterion for selecting the first code can consist in retrieving the code contained in the cell indicated by the index, while the criterion for selecting the subsequent codes can consist in retrieving and sending sequentially the subsequent codes of the code sequence.

In the case of a scenario in which the electronic transaction occurs between two parties, with direct identification of the involved stations, the first station identifies a server station of a client-server system, in which the client station is the second station.

In the more general case of a scenario with three or more parties, the operations for identifying the client and the server are performed by a new station, the "manager", which acts as an intermediary between the stations of the client-server system, as explained in greater detail hereinafter. In this context, the manager is the only entity that is capable of authenticating, generating, distributing and managing the code sequences, one for each user who wishes to perform secure transactions by using the method presented in the invention.

BRIEF DESCRIPTION OF THE DRAWINGS

Further characteristics and advantages of the invention will become better apparent from the following detailed description, given by way of non-limiting example and accompanied by the corresponding figures, wherein.

DESCRIPTION OF THE INVENTION

Figure 1:
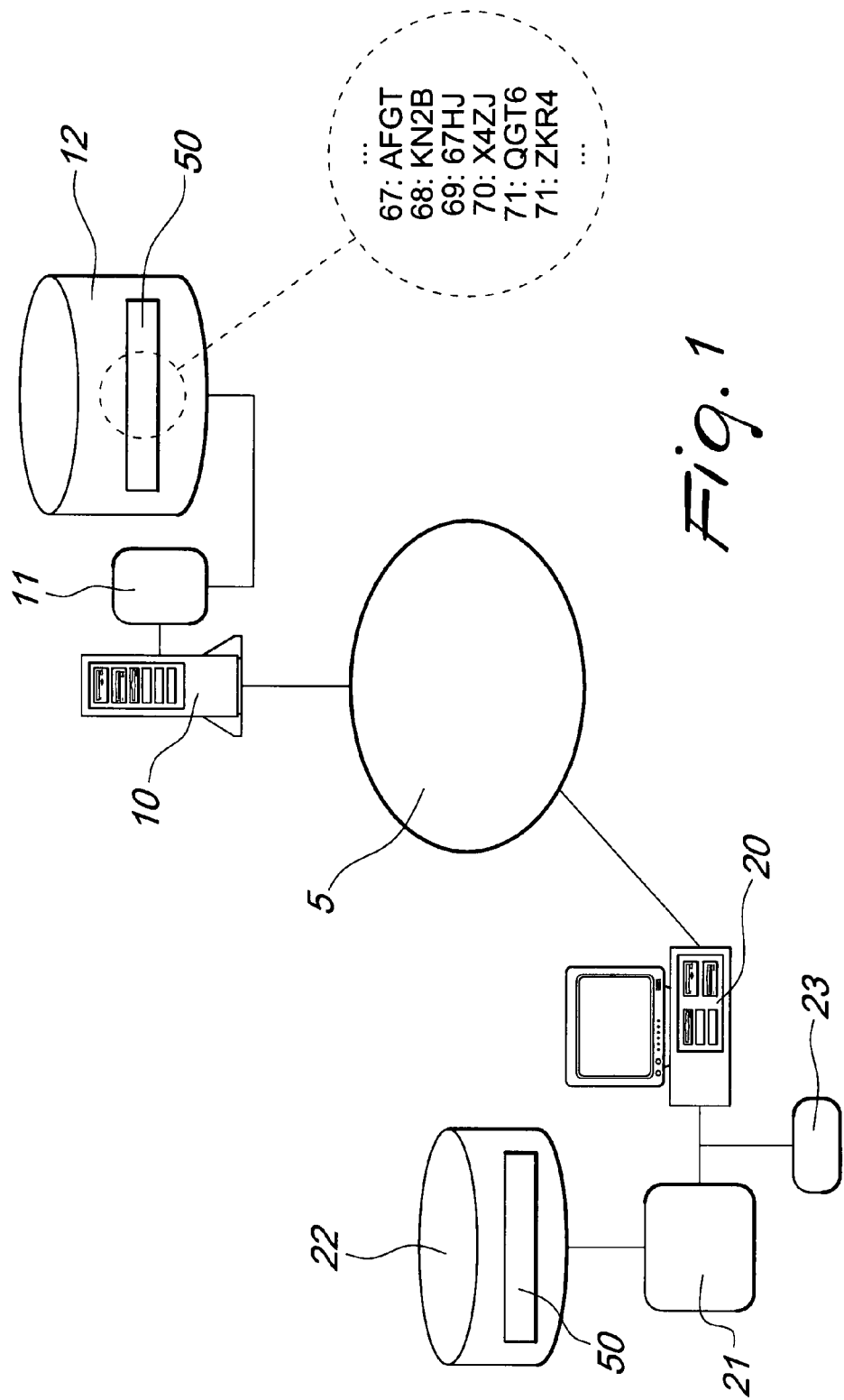
FIG. 1 is a block diagram of the architecture of the system in a preferred embodiment of the system according to the invention, related to a scenario with two stations which are mutually communicating.

FIG. 1 illustrates the inventive concept according to the present invention in a first embodiment, in which two stations 10 and 20, connected via a data communications network 5, for example the Internet, interact in order to perform a transaction.

The station 10 comprises processing means 11 and a database 12 in which a code sequence 50 is contained.

Likewise, the station 20 comprises processing means 21 and a database 22 in which the same series 50 is contained.

The expression "processing means" is typically understood to reference a software program, a firmware or any software/hardware combination capable of performing calculations and of managing information related to the reference databases or to the sequences in general, as is known trivially to the person skilled in the art.

The system thus described is identified, for the sake of clarity, as a typical client-server system, in which the station 10 acts as a server and the station 20 acts as a client.

Figure 2:
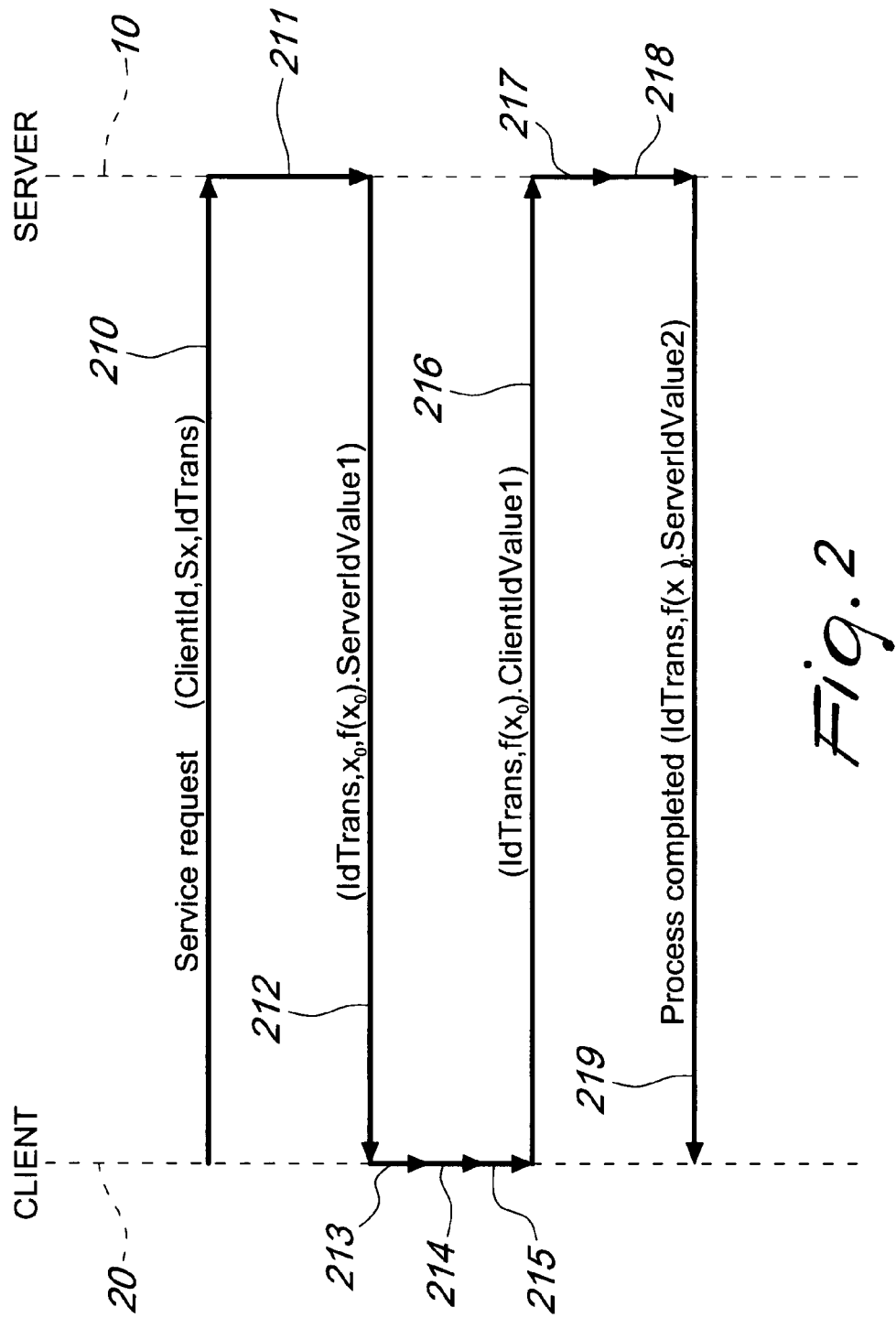
FIG. 2 is a flowchart of the operations performed in the case of the scenario of FIG. 1.

With reference to FIG. 2, operation of the system according to the present invention is as follows.

First of all, it is necessary to load the databases 12 and 22 with an identical code sequence 50. The codes can be numeric values, alphanumeric values or values in any binary format and of any size, depending on the requirements and on the context of use. In the embodiment of FIG. 1, the code sequence is preferably generated by the server 10 according to any criterion, typically in an entirely random manner.

Once generated, the sequence is stored in the database 12 and is supplied to the client 20 by using secure communication channels, for example by mail delivery or by collection at a counter by the user of the station 20, on a medium that is compatible with the IT means of said station 20.

According to a preferred embodiment, said medium is a card in the credit-card format, for example of the smart-card type, and the station 20 is provided with an appropriate card reader 23. The card may also contain an amount of data sufficient to identify uniquely the card and/or its owner, for example: the version number of the card, the card identification code, the user identification code, the surname, name and PIN of the user, and an identification function f(x), the meaning whereof will become apparent hereinafter.

As an alternative, the medium can be any magnetic, optical or solid-state medium, for example a diskette, a CD, a DVD, a USB key or others, the contents whereof can be read by the IT means of the station 20.

Merely for the sake of clarity, the sequence 50 supplied to the station 20 is understood to be stored in a database 22. However, the person skilled in the art understands without any effort that said sequence can remain on the original medium and be managed in a fully equivalent manner to what will be now described hereinafter.

The database 12 of the server 10 contains a plurality of different sequences, equal to the number of registered clients that can request a secure connection with said server 10. Likewise, the station 20 has available a different sequence for each server with which it is registered.

With reference to FIG. 2, when the client 20 wishes to request any service from the server, by using the security system according to the present invention, it sends a transaction request to the server 10, sending initial data suitable to identify it at the server 10, for example its own ClientID known to the server 10, a code which identifies the requested service "Sx", and another code "IdTrans" for identifying the transaction itself (step 210).

In step 211, the server 10, on the basis of the client identification information that it has just received, selects the sequence 50 associated with the client 20 and generates an index $x_0$, which indicates a cell of said sequence. At the same time, it calculates according to a predefined criterion a value $f(x_0)$, which can be for example the code contained in the cell $x_0$. It further marks this index $x_0$ as already used and unusable in the future.

In the example of FIG. 1, which shows by way of example a sequence of codes of four bytes each, the value $x_0$ identifies the cell number 70, while the value $f(x_0)$ corresponds to the content of the cell itself, "X4ZJ".

In step 212, both the value $x_0$ and the value "X4ZJ" are sent by the server 10 to the client 20 together with conventional auxiliary information, providing for example a transaction identification code.

In step 213, the client 20 receives the index $x_0$ and calculates the code $f(x_0)$ that it expects to have received from the server. In the example, the client 20 checks that the code contained in the cell 70 is actually "X4ZJ". Otherwise, the procedure ends with failure of the client to recognize the server, since the incorrect indication provided by the server can indicate an attempt to fraudulently impersonate the server 10 by an unauthorized third party.

If instead the value is correct, the processing means 21 mark the index cell $x_0=70$ as an already-used cell, making it unavailable for future use (step 214).

At this point, the transaction can continue. In step 215, the processing means 21 retrieve a new value from the sequence according to a calculation formula which is known both to the server 10 and to the client 20. For example, this calculation formula may consist in retrieving the value contained in the subsequent cell $x_0+1=71$, which in the example of FIG. 1 contains the value "QGT6".

In step 216, the client 20 sends this value to the server 10, which receives it and performs its own counter-check (step 217), checking whether the sequence 50 actually provided for that value in the expected position.

If this is not the case, the server does not recognize the client, the transaction is suspended and the procedure ends, since the incorrect indication supplied by the client may indicate an attempt at fraudulent impersonation of the client 20 by an unauthorized third party.

If instead the value is correct, the processing means 11 of the server 10 mark the cell $x_0+1=71$ as an already-used cell, making it unavailable for future use, and the client 20 is identified correctly.

At this point, the procedure can continue as necessary. The server 10 performs the service "Sx" (step 218) and may optionally send additional data to the client 20, identifying itself by means of the value contained in the cell $x_0+2$ (step 219). Likewise, the client, after checking the value contained in the cell $x_0+2$ and consequently obtaining assurance that the data have actually been sent by the server 10, can reply by sending the content of cell $x_0+3$, and so forth.

It should be noted that the eavesdropping on the part of an ill-intentioned person of even all the indices and codes transmitted by the client 20 to the server 10 and vice versa is not sufficient to undermine the security of the transactions. The values used are in fact marked as no longer usable by the client and the server as soon as they are sent in output or received in input, and therefore even eavesdropping of the entire exchange of data between the server 10 and the client 20 does not allow to reconstruct a valid sequence.

Selection of a code at an index $x_0$ can be made according to various criteria, which may even be mutually different during the communications related to a transaction. For example, the selection of the first identification code that the server 10 sends to the client 20 can be made with a first criterion, the selection of the reply code of the client to the server can be made with a second criterion, and the remaining selections can be made by means of a third criterion, provided of course that the criteria are known to both stations.

It should also be noted that although the description has been given in generic form on the basis of a sequence of codes stored in a single vector (array), the person skilled in the art understands easily that the same inventive concept can be implemented in different but entirely equivalent manners.

For example, the code sequence can be divided into two parallel sequences, in which values related to the client reside on one side and values related to the server reside on the other side.

Likewise, in the case of transactions that require a number n of messages from the client toward the server and a number k of messages from the server to the client, it is possible to provide an implementation solution by means of a table provided with n values for identifying the client and k values for identifying the server at each index $x_0$.

It is therefore evident that the term "cell" as used here to identify an element of a vector indicates in the same manner a cell in a matrix of codes rather than a property in a structure or a data class, i.e., in other words, the object in which one or more codes are stored.

For example, in an embodiment which illustrates what has been described above, again with reference to FIG. 2, operation of the method according to the present invention is as follows.

After receiving the identifying information of the client 20 in step 211, the server 10 selects the sequence 50 associated with the client 20 and generates an index $x_0$, which indicates a cell of said sequence. At same time, it determines the value "$f(x_0)$.ServerIdValue1", i.e., a first value that identifies the server. Moreover, it marks the index $x_0$ as already-used and unusable for subsequent transactions.

In step 212, both the value $x_0$ and the code "$f(x_0)$.ServerIdValue1" are sent by the server 10 to the client 20.

In step 213, the client 20 receives the index $x_0$ and calculates the code "$f(x_0)$.ServerIdValue1" that it expects to have received from the server, checking whether it is correct. If it is not, the procedure ends, since the incorrect indication provided by the server may indicate an attempt at fraudulent impersonation of the server 10 on the part of an unauthorized third party.

If instead the value is correct, the processing means 21 mark the cell $x_0=70$ as an already-used cell, making it unavailable for subsequent transactions (step 214).

At this point, the transaction can continue. In step 215, the processing means 21 determine the value "$f(x_0)$.ClientIdValue1", which in step 216 the client 20 sends to the server 10, which receives it and performs its own countercheck, checking whether the value "$f(x_0)$.ClientIdValue1" is the correct one (step 217).

If it is not, the transaction is suspended and the procedure ends, since the incorrect indication provided by the client may indicate an attempt at fraudulent impersonation of the client 20 on the part of an unauthorized third party.

If instead the value is correct, the client 20 is identified correctly.

At this point, the procedure can continue as needed. The server 10 performs the service "Sx" (step 218) and may optionally send additional data to the client 20, identifying itself by means of the code "$f(x_0)$.ServerIdValue2" (step 219). Likewise, the client, after checking the code "$f(x_0)$.ServerIdValue2" and consequently obtaining assurance that the data have actually been sent by the server 10, can respond by sending the code "$f(x_0)$.ClientIdValue2", and so forth.

It is evident to the person skilled in the art that the calculation and verification of a code can be performed in various manners, which are all equivalent from the standpoint of the inventive concept according to the present invention. The calculation of a code can be the retrieval of a code from a memory cell but can also be a more complex processing performed on the basis of the selected index $x_0$ and of the information contained in the sequence, for example by means of mathematical or logical operations or execution of formulas. Likewise, the verification on the part of the receiving station can consist in reading the contents of a corresponding memory cell or can consist of a more complex processing which yields an expected result. Thus, for example, although identical sequences are referenced in this context for reasons of clarity and simplicity of presentation, it is evident that a one-to-one relation between the two sequences is sufficient in order to implement the inventive concept according to the present invention. For example, the sequence on the server side might contain a first set of codes and the sequence on the client side might contain a second set of codes, in which each code is processed starting from the corresponding code in the first set, according to predefined criteria.

It is also evident that depending on the choice of embodiment, it becomes convenient to mark a code as already used and not reusable for a subsequent transaction or to mark an index as already used and not reusable in the context of a new transaction, and therefore the meaning of "code" or "index" can become interchangeable depending on the context.

Figure 3:
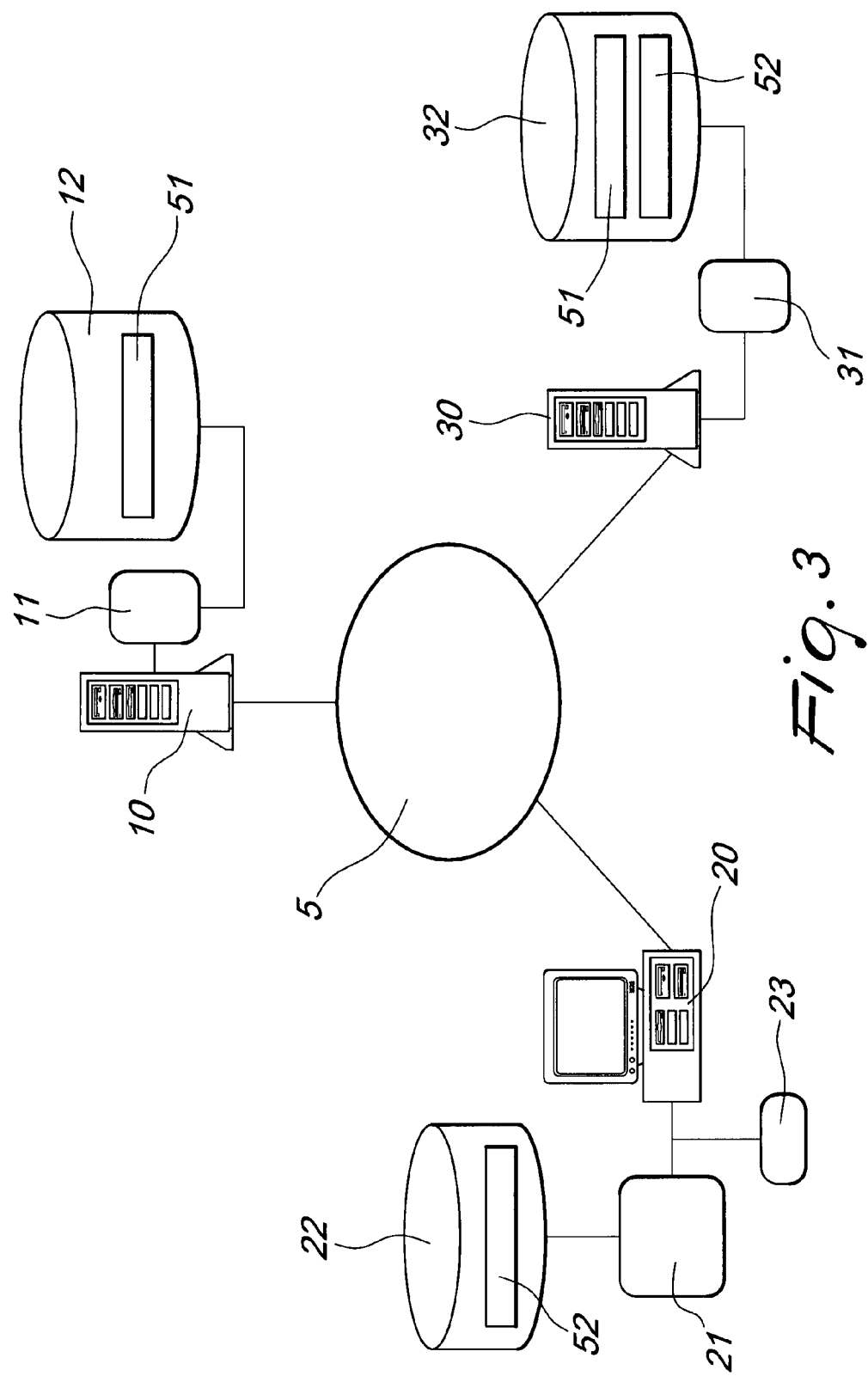
FIG. 3 is a block diagram of the architecture of the system in a second preferred embodiment of the system according to the invention, related to a scenario with more than two stations mutually communicating.

FIG. 3 illustrates a second preferred embodiment of the system according to the invention, in which management of the inherent security codes is entrusted to a dedicated manager 30, which is also connected to the data communications network 5.

The station 10 is now identified by the term "provider" for the sake of clarity. It comprises processing means 11 and a database 12 which contains a sequence of codes 51 and is capable of communicating also with the manager 30.

Likewise, the station 20 comprises processing means 21 and a database 22, which contains a different series 52. In this case also, the station 20 identifies a station that wishes to request a service from the station 10.

The system thus described again provides in practice a client-server system, in which the station 20 acts as a client and the station 10 acts as a server as regards transactions. However, as will become apparent from the following description, both make use of the presence of the manager 30 in order to benefit from the inherent security ensured by the system according to the invention. For the sake of simplicity and clarity in presentation, the station 20 is now identified by the term "customer".

The manager 30 comprises processing means 31 and a database 32, which contains both sequences 51 and 52.

Figure 4:
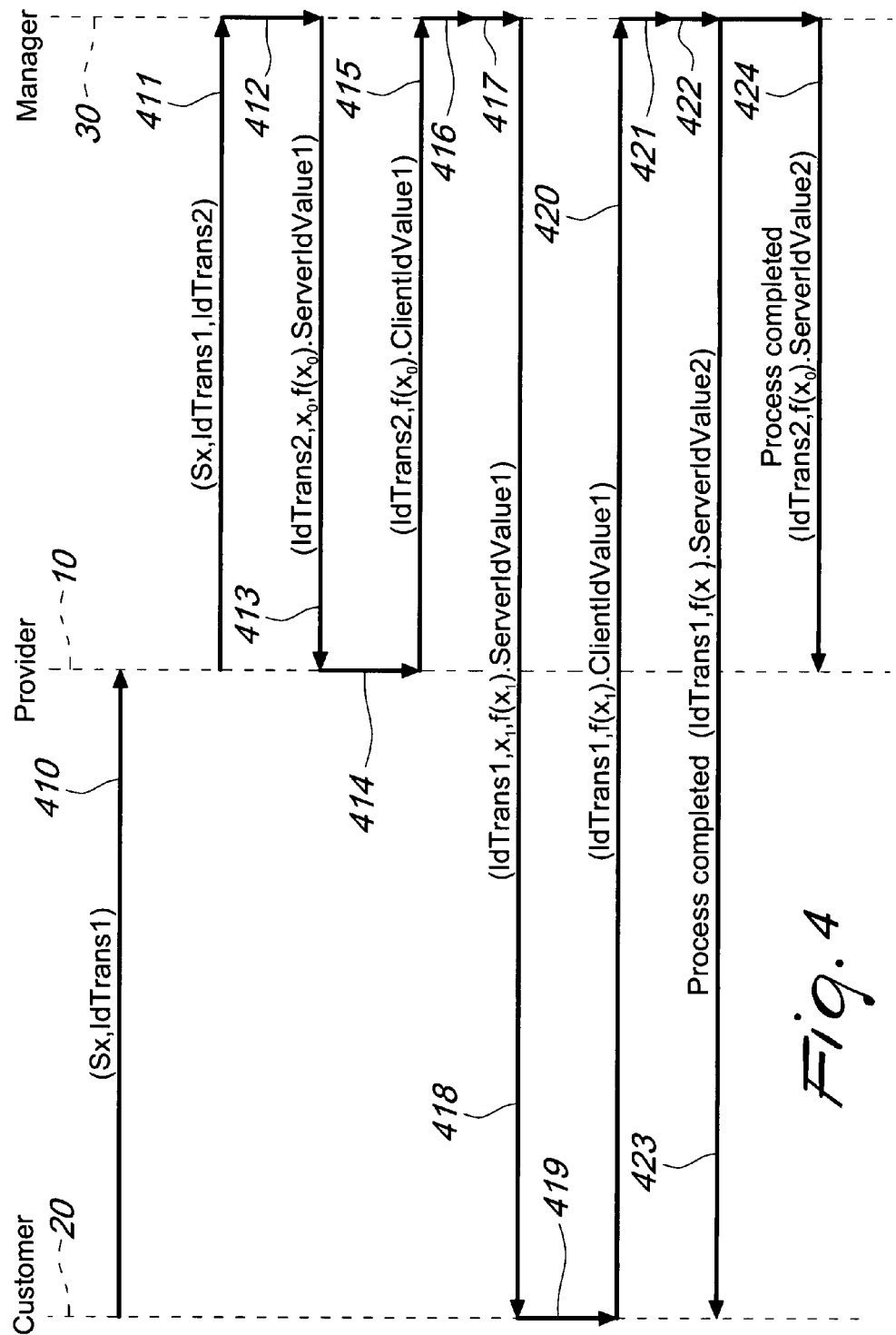
FIG. 4 is a flowchart of the operations performed in the case of the scenario of FIG. 3.

FIG. 4 exemplifies the operation of the system according to the second preferred embodiment of the present invention.

First of all, it is necessary to enter into the databases 12 and 32 the same sequence of codes, which will be used for certification, on the part of the manager 30, of the identity of the provider 10 and for certification, on the part of the provider 10, of the identity of the manager 30. Likewise, a new sequence, different from the preceding one, must be loaded both into the database 32 of the manager and into the database 22 of the customer and will be used for certification of the customer 20 on the part of the manager 30 and for certification of the identity of the manager 30 on the part of the customer 20. In this case also, the codes can be numeric values, alphanumeric values, or values in any binary format of any size according to the requirements and the context of use.

In step 410, the customer 20 who wishes to initiate a secure transaction process with the provider 10 sends a signal in this regard to the provider 10, identifying the requested service "Sx" and sending a first transaction identification code "IdTrans1".

In step 411, the provider 10 sends a request to manage the transaction securely to the manager 30, in turn sending a second transaction identification code "IdTrans2", together with other information, including the "IdTrans1" code and the identifier of the service "Sx" received by the customer 20.

In step 413, the manager 30 sends to the provider 10 a secure identification request related to the transaction, transmitting, together with the code that identifies the transaction with the provider "IdTrans2", an index $x_0$, which indicates a point of the sequence of codes 51 and a code that belongs to said sequence and is calculated (in step 412) on the basis of the index $x_0$. For the sake of clarity in presentation, this identification code is referenced in FIG. 4 by the caption "$f(x_0)$.ServerIdValue1". At this point, the manager marks $x_0$ as already used and no longer usable.

In step 414, the provider 10, after receiving the value $x_0$, calculates the expected value "$f(x_0)$.ServerIdValue1" and compares it with what it has received. If the result is different, the transaction ends, since an attempt to fraudulently impersonate the manager 30 by an unauthorized third party may be in progress.

If the result of the comparison is instead positive, $x_0$ is marked as already used and no longer usable and the processing means 11 calculate the code to be sent in response to the manager 30, referenced in the figure by the caption "$f(x_0)$.ClientIdValue1", and send it to the manager together with the value "IdTrans2" (step 415).

In step 416, it is the manager that checks the correctness of the received value "$f(x_0)$.ClientIdValue1".

If the operation is successful, the provider 10 and the manager 30 have correctly certified each other and the manager 30 starts the operation for identifying the customer 20 with a sequence of steps that is similar to what has been described for the identification of the provider 10.

In detail, in step 418 the manager 30 sends to the customer 20 a request for secure identification related to the transaction, transmitting, together with the identification code of the transaction with the customer "IdTrans1", an index $x_1$ which indicates a point of the code sequence 52 and a code that belongs to said sequence and has been calculated previously (step 417) at the manager on the basis of said index $x_1$. For the sake of clarity in presentation, this identification code is referenced in FIG. 4 with the caption "$f(x_1)$.ServerIdValue1". At this point, the manager marks $x_1$ as already used and no longer usable.

In step 419, the customer 20, after receiving the value $x_1$, calculates the expected code "$f(x_1)$.ServerIdValue1" and compares it with what it has received. If the result is different, the transaction ends, since once again an attempt at fraudulent impersonation of the manager 30 by an unauthorized third party may be in progress.

If the comparison instead yields a positive result, $x_1$ is marked as already used and no longer usable and the processing means 11 calculate the code to be sent in response to the manager 30, referenced in the Figure by the caption "$f(x_1)$.ClientIdValue1", and send it in step 420 to the manager together with the value "IdTrans1".

In step 421, the manager 30 checks the received data and, if the outcome is positive, the manager 30 and the customer 20 have authenticated each other; at this point, the manager 30 can actually process the request for the service Sx (step 422) and end the transaction.

In steps 423 and 424, the manager can then report to the provider and to the customer the result of the transaction with messages that are again authenticated by the codes "$f(x_0)$.ServerIdValue2" and "$f(x_1)$.ServerIdValue2".

The person skilled in the art understands without effort that the method and system thus conceived can be used in any scenario in which it is necessary to work in secure communication conditions as regards the identification of the parties involved in the exchange of data, by involving two or more parties, in which identification occurs mutually for each message exchanged during the transaction.

In practice it has been found that the method and system according to the invention can be applied in various contexts, from operations for making purchases over the Internet or over a generic data communications network to the control of remote stations, for example robots, without the risk of interference by third parties, to communications and operations for withdrawal with cash dispensers and ATMs in general.

In the case of a direct connection between the client station, for example a credit card-sized card and a server, for example the cash dispenser station, it is also possible to perform code top-up operations automatically if the number of codes available has dropped below a certain threshold or when requested by the client, or also at each transaction in order to regenerate the codes that have just been used, obviously by using a rewritable card. This operation allows to replace the already-used codes with new codes. In this case, of course, the regenerated codes and/or the corresponding indices are therefore reusable in future transactions.

It has thus been shown that the invention thus conceived achieves the intended aim and objects. In particular, the invention ensures an inherent level of total security during the transaction, since the authentication values, particularly the index $x_0$ and the corresponding code calculated on the basis of the content of the cell $x_0$, can be used only once. The only possibility to impersonate a client during an operation would be to possess the entire sequence of values assigned to the client over a secure channel. To further increase the security level, the server can choose at random the index $x_0$ to be communicated to the client: however, this is not strictly necessary, since it is sufficient to select as an initial index the first index $x_0$ that is available, which corresponds to the first cell of the sequence that has not yet been used.

If, during a transaction, the values $x_0$ and $f(x_0)$ are eavesdropped, they are in any case not usable by the eavesdropper, since said values can be used only once and therefore will not be prompted again by the server. The eavesdropper would therefore in practice have to guess the next value in the sequence in order to reply correctly to the server, and this becomes impossible even if the codes used are only a few bytes long. For example, by using even just four bytes for the identification codes, the possibility to guess the correct code in the sequence is 1 in $2^{32}$, i.e., less than one in 4 billion.

Similar remarks apply in the case of an attempt of a third party to impersonate the server side.

The inherent security thus obtained by the system according to the present invention makes it unnecessary to encrypt the security information in transit on the data communications network.

The description of the preferred embodiments described above is of course given merely by way of non-limiting example.

The invention thus conceived is in fact susceptible of numerous modifications and variations that can be clearly deduced by the person skilled in the art, all of which are within the protective scope of the appended claims. It is also evident that the inventive concept on which the present invention is based is independent of the specific practical embodiment, of the type of values used, and of the actual method of implementation. Therefore, the protective scope of the claims must not be limited by the illustrations or by the preferred embodiments presented in the description as examples, but rather the claims must comprise all the characteristics of patentable novelty that reside within the present invention, including all the characteristics that would be treated as equivalents by the person skilled in the art.

The disclosures in Italian Patent Application No. MI2004A001913 from which this application claims priority are incorporated herein by reference.

What is claimed is:

1. A method for secure identification of a server station and a client station that are both connected and interact over data communications networks during a transaction, said server station and said client station each comprising respectively a database and a data processor, a code sequence being contained in both databases of said server station and said client station, the method comprising the sequential steps of:

a) transmitting on the part of the server station to the client station, an identification index of a reference cell that belongs to said code sequence and a first code that belongs to said code sequence and is chosen according to a first criterion, which is known to both said server station and said client station and is based on said identification index;

b) marking, after step a) on the part of said server station, the identification index that has been used as unusable for subsequent transactions;

c) identifying, on the part of said client station, said reference cell in the sequence of codes through said identification index and calculating the first code that is expected to have been received from said server station according to the common first criterion and the identification index;

d) verifying, after said step c), on the part of said client station that said first code received from the server station is equal to the calculated first code;

e) if the first code calculated in the client station is equal to the first code sent by the server station, e1) marking on said client station, the index cell as an already used cell; and e2) after said marking on said client station the process continues transmitting, on the part of said client station toward said server station, a second code, which belongs to said code sequence and is calculated according to a second criterion, which is known both to said server station and to said client station and is also based on the identification index; and f) verifying said second code on the part of the server station.

2. The method according to claim 1, further comprising the following steps:

g) transmission, on the part of said server or client station to said client or server station respectively, of an additional code that belongs to said code sequence and is calculated on the basis of a third criterion known both to said server station and to said client station and based on said identification index;

h) verification of said additional code on the part of said client or server station respectively.

3. The method according to claim 2, wherein the steps g) and h) are iterated for further communications of said transaction.

4. The method according to claim 1, wherein said steps a)-f) are reiterated for each step of the transaction as regards the communication from said server station to said client station.

5. The method according to claim 1, wherein said step of marking the indices related to the used codes as unusable is performed by said client station as well.

6. The method according to claim 1, wherein the selection of the identification index to be sent to the client station is performed by said server station.

7. The method according to claim 1, wherein said codes are numeric, alphanumeric or binary values.

8. The method according to claim 1, wherein said first criterion consists in selecting the code contained in the cell indicated by said identification index.

9. The method according to claim 2, wherein said second and third criteria consist in selecting the code contained in the next available cell with respect to the identification index of the last used cell.

10. The method according to claim 1, wherein said code sequence comprises a part of codes dedicated to the communication from said server station toward said client station and a part of codes dedicated to communication from said client station to said server station.

11. The method according to claim 1, wherein said code sequence is generated by said server station.

12. The method according to claim 1, wherein said server station is a station of a security manager and said client station is a client station of said security manager and a client of a client-server system defined by said client station and by a third station, said third station being in turn a client station of the security manager and operating according to the same steps a)-f) on a second code table, the manager acting as an authenticator in order to guarantee the inherent security of the exchanges of data related to the transaction.

13. The method according to claim 1, wherein said transaction comprises an automatic generation, on the part of said server station, of new codes and the transmission of said valid codes to said client station.

14. The method according to claim 1, wherein said data communications networks is the Internet.

15. A system for secure identification of a server station and a client station that are both connected and interact over data communications networks during a transaction, said server station and said client station each comprising respectively a database and a data processor, a code sequence being contained in both databases of said server station and said client station;
 a) said server station being adapted to select an identification index of a reference cell that belongs to said code sequence and a first code that belongs to said code sequence and is chosen according to a first criterion, which is known to both said server station and said client station, said server station being also adapted to transmit said identification index and said first code to said client station;
 b) said client station being adapted to identify said reference cell in the sequence of codes through said index and to calculate the first code that it is expected to have been received from said server station;
 c) said client station being further adapted to verify said first code received from the server station by verifying that the received first code is equal to the calculated first code;
 d) said client station being further adapted to select a second code, which belongs to said code sequence and is calculated according to a second criterion, which is known both to said server station and to said client station, said client station being also adapted to transmit said second code to said server station;
 e) said server station being further adapted to verify said second code;
 f) the data processors at said server station and at said client station being adapted to mark the indices related to the codes that have been used as unusable for subsequent transactions.

16. The system according to claim 15, wherein said codes are numeric, alphanumeric or binary values.

17. The system according to claim 16, wherein said code sequence comprises a portion of codes dedicated to communication from said server station toward said client station and a portion of codes dedicated to communication from said client station to said server station.

18. The system according to claim 15, wherein said server station is a station of a security manager and said client station is a client station of said security manager and a client of a client-server system defined by said client station and by a third station, said third station being in turn a client station of the security manager and operating according to the same steps a)-f) on a second code table, the manager acting as an authenticator in order to guarantee the inherent security in the exchange of data related to the transaction.

19. The system according to claim 15, wherein said data communications networks is the Internet.

* * * * *